Figure 1:
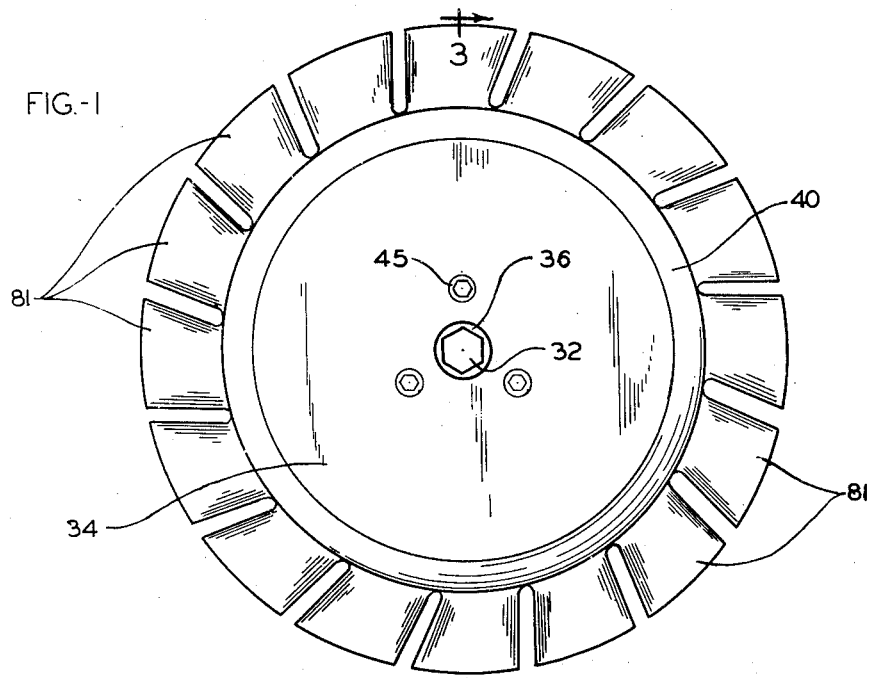

July 12, 1949.　　　　　　F. M. JONES　　　　　2,475,842
STARTER GENERATOR
Filed Oct. 26, 1944　　　　　　　　　　　　　3 Sheets-Sheet 1

*INVENTOR.*
FREDERICK M. JONES
BY *M. A. Whiteley*
ATTORNEY

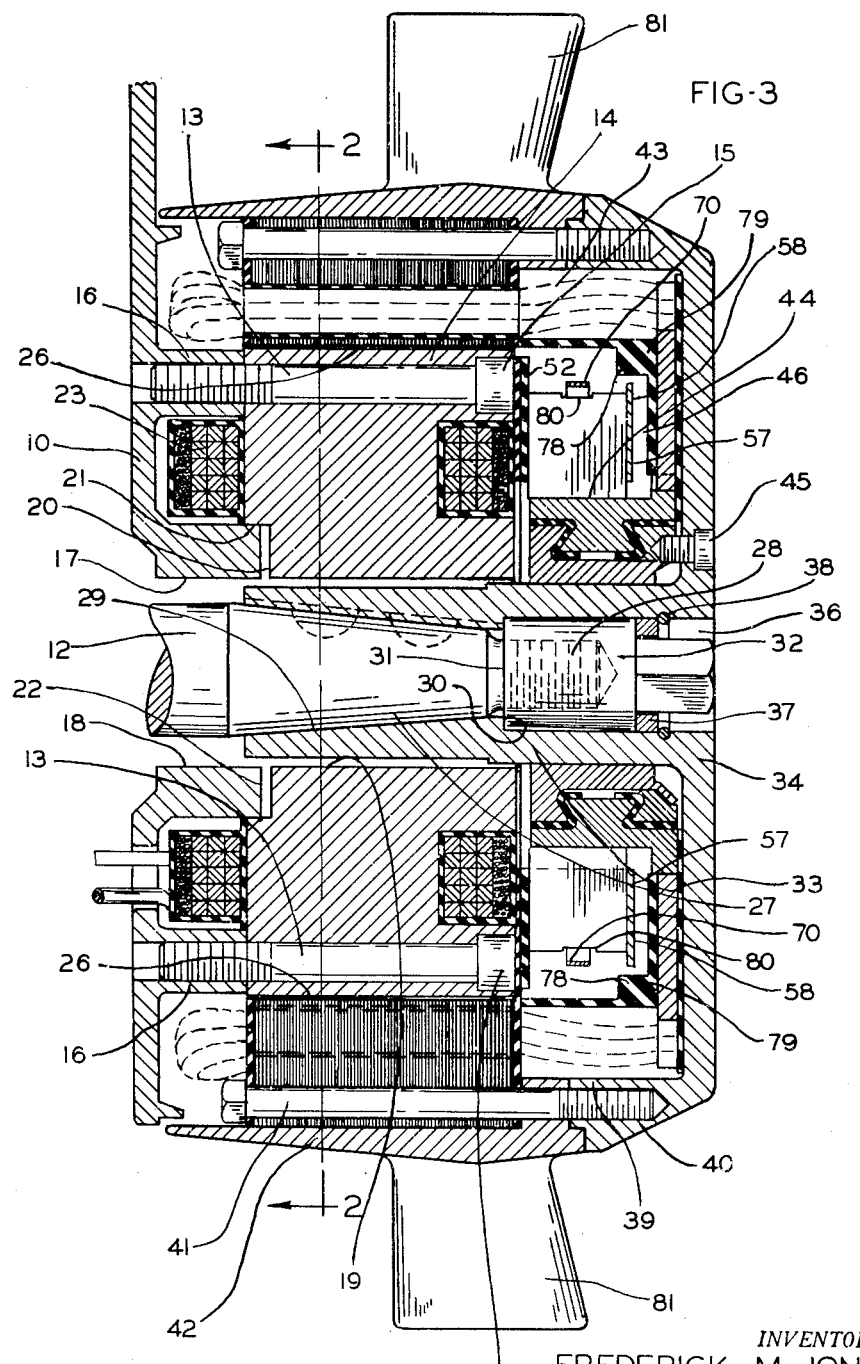

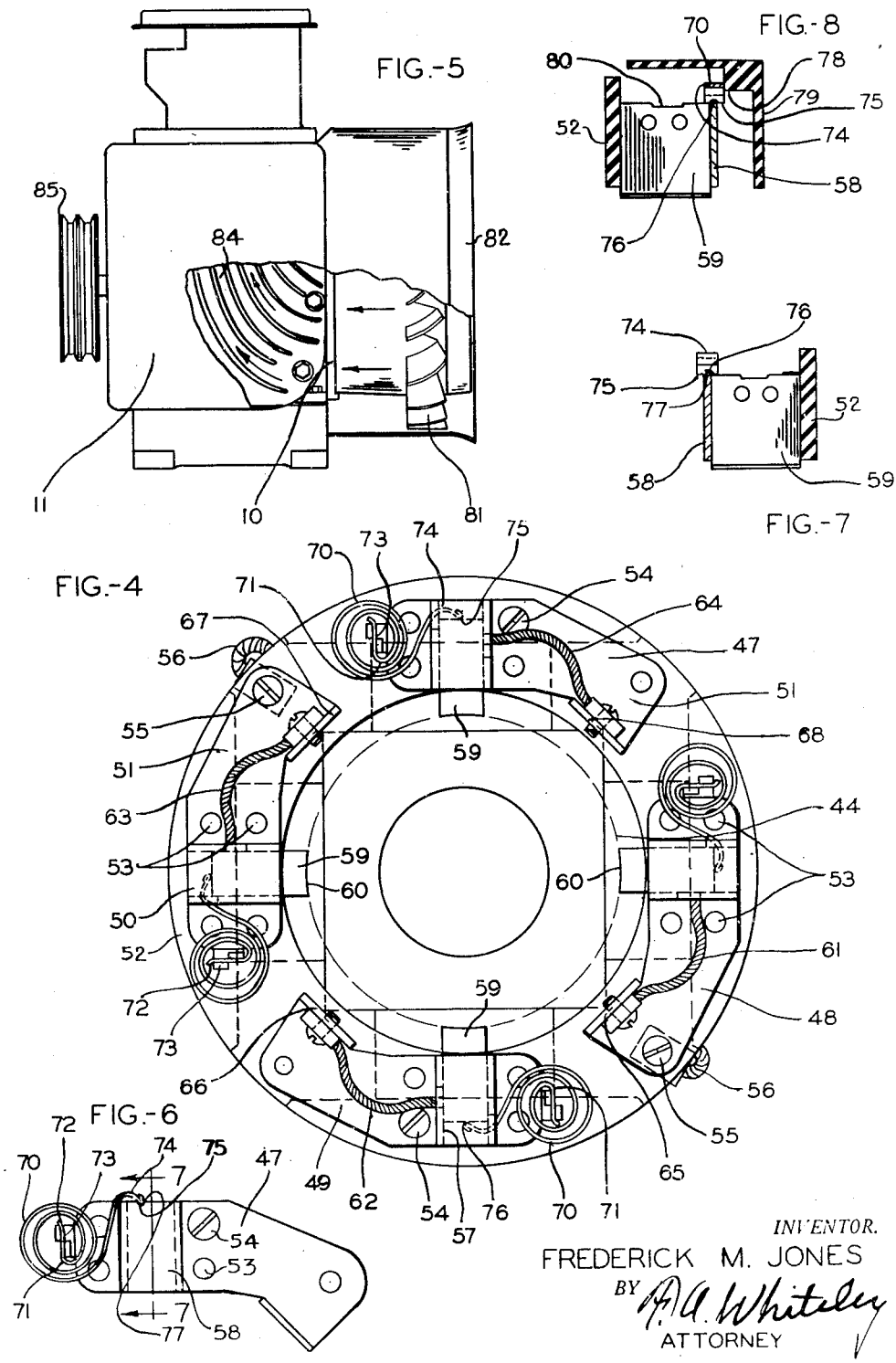

Patented July 12, 1949

2,475,842

UNITED STATES PATENT OFFICE 2,475,842

STARTER GENERATOR

Frederick M. Jones, Minneapolis, Minn., assignor, by mesne assignments, to U. S. Thermo Control Co., Minneapolis, Minn., a corporation of Minnesota Application October 26, 1944, Serial No. 560,454

9 Claims. (Cl. 172—36)

1

My invention relates to starter generators and has for its object to produce a starter generator which in combination with the gas engine to which it will be attached has greater efficiency in proportion to power consumed, is more certain in operation, and combines with the motor in a manner to produce advantageous cooling thereof.

In practice it has been customary in starter generators of the type referred to to hold the magnetic field with its windings and poles stationary and external to the armature and to rotate the armature in the form of a laminated cylinder within the field coils and windings positioned as in a hollow shell. A chief difficulty which has been encountered from this arrangement has been that the pole pieces are widely spaced and the armature has to be rotated at very high speed so that even though the commutator is reduced in diameter the actual flow of current impulses thereto and therethrough is very much less than would be anticipated. Also, although it has been proposed to mount the armature so it will serve the purpose of an inertia fly wheel, its diameter necessarily within the shell of the field poles, can not be great enough to provide the necessary inertia power for an effective fly wheel. It is also true that with the rotating part in the center of the shell it is impossible to form directly therewith vanes which may operate as blower means to cool the motor.

I have discovered that by arranging the field poles and windings in the form of a cylinder of relatively small diameter and holding it stationary at the center of the generator and by forming the armature as a hollow shell and rotating it with its connected commutator about the field poles and field windings, the above noted difficulties are eliminated and at the same time there is produced a much more efficient generator or starter generator for the electric current generated or required and one which is a perfect combined inertia fly wheel and blower positioned directly upon the motor shaft so at the same time to provide the required inertia power to absorb the inertia losses from the reversals of movement of the pistons and to produce a strong current of air to pass through the radiator fins of an air cooled gas engine and thus to cool the same.

It is a principal object of my invention, therefore, to arrange the field poles and windings of a generator in the form of a relatively solid cylinder held stationary at the center of the generator with an opening through the center thereof for the reception of an extension of the gas engine motor shaft to which a rotatable armature is attached.

It is a further object of my invention to mount upon said extension of the motor shaft a framework connected with the motor shaft so that a commutator will be rotated with the armature.

It is a further object of my invention to mount upon one side of the cylindrical pole pieces the customary brushes for taking off electric energy and to hold said brushes in circumferentially fixed positions and in yielding engagement with the aforesaid commutator.

It is a further object of my invention to provide brush holders having means for holding the brushes for radial inward and outward movements in combination with spring means freely engageable with the outer ends of the brushes and adapted to be positioned in non-engaging relation to the brushes of such a nature that when the commutator is disassembled from the generator the brushes can be placed in non-protruding position and the act of pushing the frame and armature into place on the shaft will automatically release the springs to cause the brushes to be protruded to engage the commutator when the frame and armature have been brought into final operating position.

The full objects and advantages of my invention will be pointed out in detail and in the various relationships of the parts in the following specification, and the various novel features individually in making up such combinations will be recited in their cooperating combinations in the appended claims.

Figure 2:
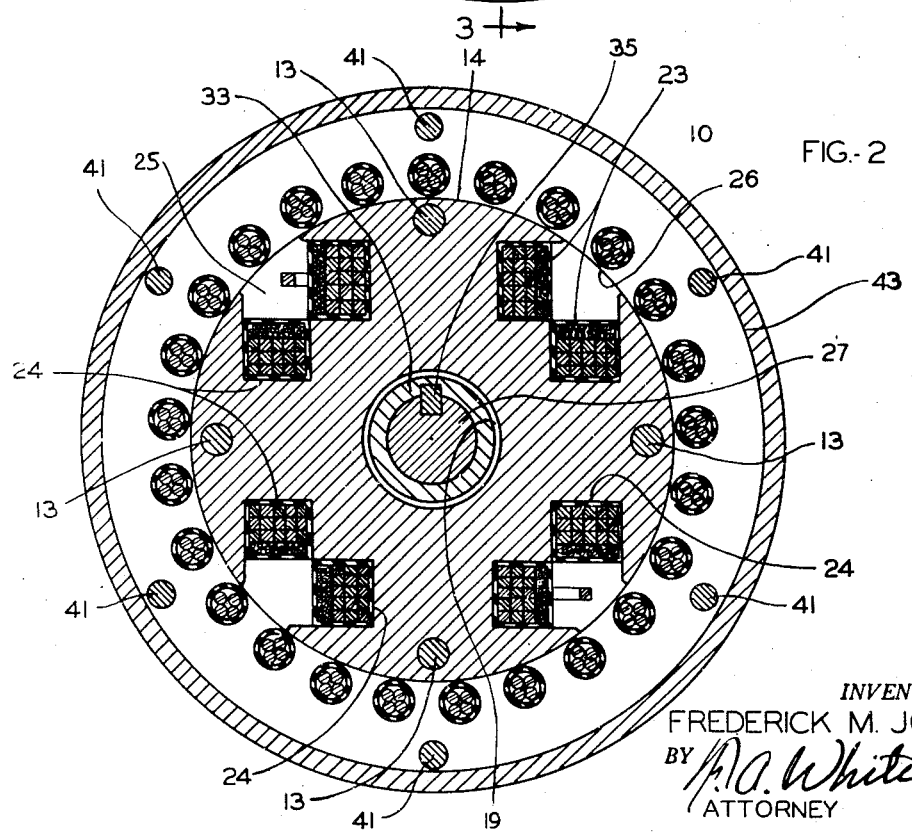

In the drawings illustrating an application of my invention in one form; Fig. 1 is an end elevation view of my improved generator as it would appear in position assembled upon the motor shaft of a gas engine. Fig. 2 is a transverse sectional view taken on line 2—2 of Fig. 3. Fig. 3 is a longitudinal sectional view on an enlarged scale taken on line 3—3 of Fig. 1. Fig. 4 is a front elevation view of the ring supporting the different brush holders and the brushes therein and springs therefrom disassembled from the generator. Fig. 5 is a side elevation view on a reduced scale of a gas engine having my improved generator attached thereto with some parts broken away. Fig. 6 is a detail view of one of the brush holders showing the brush non-protruded and the spring in non-protruding position. Fig. 7 is a sectional view taken on line 7—7 of Fig. 6. Fig. 8 is a sectional view corresponding to a part of the view of Fig. 3 showing one of the brush springs held inoperative and about to be pushed in operative position.

A base plate 10, Figs. 3 and 5, is adapted to be bolted directly to the face of a gas engine 11 surrounding the motor shaft 12 thereof. To this base plate is secured by a multiplicity of bolts 13, as shown in Figs. 2 and 3 (four as shown in Fig. 2), a pole piece designated generally in Fig. 2 by the numeral 14. The bolts 13 have their heads 15 countersunk in sockets in the outer face of pole piece 14 and are screwed into internally threaded bosses 16, Fig. 3, extending outwardly from base 10.

The base 10 is provided with a circular boss 17 which surrounds a central circular opening 18 through the base plate 10. A corresponding opening 19 is formed in the pole piece 14. The pole piece is provided with an annular groove 20 forming a lip 21 which surrounds the inner edge 22 of the boss 17. The individual field windings 23, of known arrangement, are contained in channels 24 formed in the mass of the pole piece so as to leave anchor shaped poles 25 which are disposed in a cylindrical arrangement in substantial contact with a cylindrical surface 26 of pole piece 14, Figs. 2 and 3.

The shaft 12 extending through opening 18 has a portion 27 in the form of a conical frustum with a cylindrical threaded extension indicated in dotted lines in Fig. 3 at 28. Upon the conical extension 27 of shaft 12 is adapted to seat a correspondingly formed internal conical opening 29 in a tubular frame extension 33 of a frame plate 34. The extension 33 is formed with an annular ledge 30. The ledge 30 is engaged by the lower edge 31 of a nut 32 threaded upon the threaded extension 28 by which the tubular member 33 has its conical seat 29 forced upon the conical portion 27 of shaft 12. A spline 35, Fig. 2, firmly holds tubular extension 33 for rotation with shaft 12. The nut 32 is countersunk at 36 into the opening leading through tubular extension 33. The nut is locked against turning by a washer 37 and a lock ring 38 snapped into an internal groove formed in the inner body of tubular extension 33.

The frame plate 34 is a disk formed with an annular flange 39 having a sloping outer wall 40. To the flange 39 is secured by a multiplicity of screw bolts 41 a blower ring 42 and an armature designated generally by the numeral 43.

A commutator 44 in the form of a tubular member of standard construction is pressed on the extension member 33 of frame plate 34 and additionally held by screws 45 which are countersunk in the frame plate 34 and extend into segments insulated from the contact body of the commutator. The windings of the armature and the insulation as shown are of standard construction and need not be described in detail.

The frame plate 34 is thus held for rotation with and by the shaft 12. Hence the armature 43 is firmly held to rotate about the several field poles 25 and the commutator 44 rotates with the armature.

An annular space 46 is provided within the frame formed by plate 34 and commutator 44. In this space is mounted the several brush holders 47, 48, 49 and 50. Each of these brush holders comprises a plate 51 which is secured to a ring 52 formed of insulating material by means of rivets 53. Two of the brush holding plates of the respective brush holders 47 and 49 have extending through them screw bolts 54 which are screwed into threaded sockets on opposite pole pieces 25, thus grounding the contact of the brush through the pole pieces. The plates 51 of brush holders 48 and 50 have customary screw terminals 55 for transmitting current with respect to a battery through cables 56.

The several plates 51 of the respective plate holders 47, 48, 49 and 50, each carries a transverse brush holder 57 shown in section with a side wall 58, Fig. 3. In each of the brush holders 57 there is mounted for radial sliding movements a brush 59 preferably with an arcuate end surface 60, Fig. 4. The brush 59 is formed of electric conducting material and is in conducting engagement with the metallic walls of the brush holders 57, which in turn are connected with conducting cables 61, 62, 63 and 64. The cable 61 is connected with terminal bracket 65 forming part of plate 48. The cable 62 is connected with terminal bracket 66 on plate 49. The cable 63 is connected with terminal bracket 67 on plate 50 and terminal 64 is connected with cable bracket 68 on plate 51.

The plates 51 of the brush holders 47 and 49 will be grounded through screws 54 and pole piece 14. On the other hand the brushes 59 of brush holders 48 and 50 will carry current through the metallic bodies of the brush holders to the leaf-off cables 56 connected with the terminal screws 55. It follows that as the armature 44 rotates the generated current is continuously taken off through the delivery cables 56 to the battery and when the starter generator is used as a starter the current from the battery in reverse direction goes to the brushes and the commutator and to ground through the same conduction leads.

As shown in Fig. 4, I provide a simple spring arrangement for forcing the several brushes 59 against the surface of the commutator. This comprises in each instance a spring coil 70 which takes over a projection 72 on an arm 73 fast on a bracket secured to the brush holder. The outer end of the spring 70 turns downwardly, as indicated in Figs. 6 and 8 at 74. The end 75 of the spring is provided with a rounded notch-like depression 76, Figs. 7 and 8, which is adapted to engage the upper edge of the brush holder wall 58, as indicated in Figs. 7 and 8.

This arrangement is a peculiarly effective one for assembling the combined armature and commutator carried by the frame plate 34 upon shaft 33 in the generator. This assemblage has to be moved so as to bring the brushes in position to contact the rotatable commutator attached to the extension 33 of shaft 12. If the brushes were projected by springs 70 they would inevitably protrude too far and would make the assembly of the parts difficult if not impossible. The arrangement of the springs 70, as best shown in Figs. 6, 7 and 8, is such that when the spring is withdrawn from the end of the brush and rested upon the edge of the walls 58, as indicated at 77 on Fig. 7, the spring may be rendered inactive so that the brushes will be readily slid in non-protruded position within the brush holder.

The act of assembling or pushing the combined armature and commutator into position brings the springs into contact with an annular projection 78 formed at the corner of a lining member 79 formed of insulating material, Figs. 3 and 8, which pushes the spring off of the top edge of wall 58, after which it snaps into position contacting the brushes 59 in a notch 80 formed in the outer part of the brush to receive the spring 70, as clearly shown in Figs. 3 and 8, the spring held upon the plate 58 being indicated in dotted lines thereon in Fig. 4.

With this arrangement, whenever it is necessary to remove the combined armature and commutator, these parts can be simply withdrawn after the nut 32 has been unscrewed, since the brushes in contact with the commutator will readily slide along the surface thereof. Then for replacing the arrangement it is only necessary to lift the springs from engagement with the notches 80 on the backs of the brushes and rest their ends upon the walls 58 of the brush holders when the combination can be readily removed and when reassembled the annular projection 78 will push all of the springs into place.

The ring 42 serves a double function. It forms the means of holding the armature in position upon the frame plate 34 and so as to be freely rotatable about and in close proximity to the pole pieces and it also will be formed with a multiplicity of vane members 81. As best shown in Fig. 5 these members are angularly disposed and are mounted to rotate within a shroud 82 assembled upon the end of the motor 11 and over the radiator fins, as indicated in Fig. 5, and so as to leave an annular chamber within the shroud which directs the air moved by the fan blades or vanes 81 through the passages between and about radiator fins 84 cast on the motor cylinders. In this way the heat is readily removed from the engine and from the generator itself by a fan formed in conjunction with the rotating armature and commutator, which thus at the same time acts as an inertia fly wheel and a blower. Indeed, this arrangement is more efficient in cooling the motor than can be effected by independent blower separated from the generator, and it also acts effectively to cool the generator, through radiation of heat transmitted to from the ring 42 and the vanes 81.

As shown in Fig. 5, the starter generator is assembled and attached on one end of the crankshaft 12 on what may be regarded as the front end of engine 11. On the opposite end of crankshaft 12 and on what may be regarded as the rear of the engine is a power transmitting pulley 85. Pulley 85 is used to drive the main load for which the engine is intended. The starter generator being positioned on the opposite end of the crankshaft serves to stabilize the same and counter-balance the load being driven by pulley 85.

The advantages of my invention have been quite fully pointed out in the foregoing specification. These advantages are very considerable and substantial. The starter generator arrangement is very greatly simplified, the parts making it up are reduced in number and the assembly and disassembly for the purpose of changing brushes and the like is very greatly improved in the matter of ease and simplicity. Independent and separate fly wheel and air moving cooling devices are entirely eliminated, the whole assemblage acting simultaneously as a starter generator, a fly wheel and a blower. Furthermore, the arrangement of the armature in relation to the stationary pole pieces on the inside is such as to produce greatly increased efficiency of operation of the device as a generator and starter.

I claim:

1. In combination with the driven shaft of a motor, a fixed pole piece and brush holder thereon surrounding said shaft, and an armature and commutator removably mounted on the shaft to be driven thereby, brushes held on the brush holder to be radially movable thereon to engage the outer surface of the commutator, springs for forcing the brushes upon the commutator, said springs having a notched end adapted to engage the back of the brush in operative position and to be held to engage a wall of the brush holder to be held in inoperative position when the commutator and armature are pushed upon the shaft, and an insulated ring on the armature adapted to engage all the springs and cause them to move from their inoperative position to permit them to snap into operative brush engaging position when the armature has been fully pushed upon the shaft.

2. In combination with a driven shaft of a motor, a fixed pole piece surrounding said shaft, a plurality of brush holders mounted on said pole piece, an armature and commutator removably mounted on the shaft to be driven thereby, a brush positioned in each of the said brush holders to be radially movable therein to engage the outer surface of the commutator, springs for forcing the brushes upon the commutator, one end of each of said springs being movable away from each of said springs being movable away from each of said brushes whereby the brushes are retractable from the commutator when the commutator and armature are being removed from the shaft, and means positioned adjacent the armature and engageable with said springs to move them into operative positions with the several brushes when the armature and commutator are returned to their fully mounted position on the shaft.

3. A compact multiple purpose machine, including in combination, a driving and/or driven device, a crank-shaft within said device and having its opposite ends extending outwardly on either side of the device, power transmitting means connected to a first end of said shaft on one side of the device and adapted to drive a load, and a motorizing and generating unit positioned on the other side of the device for initially motorizing the device and thereafter generating electric power when the device is in a driving condition, said motorizing and generating unit comprising a stationary portion and a rotatable portion, the rotatable portion being connected to the second end of said shaft and forming an inertia flywheel to stabilize the crankshaft and counter-balance the load on the first end of said crank-shaft.

4. A compact multiple purpose machine, including in combination, a driving and/or driven device having a main driven shaft, the outer ends of said shaft extending outwardly from opposite sides of the device, power transmitting means connected to a first end of said shaft and adapted to drive a load, and a motorizing and generating unit positioned on the opposite side of said device from said power transmitting means comprising a cylindrical pole piece having field windings adjacent its periphery, means for rigidly securing said pole piece on the side of the device, said pole piece having a central aperture loosely surrounding the second end of the driven shaft, a relatively flat plate member having a peripheral flange which extends beyond the outer limits of the pole piece and forms an outer enclosure about the pole piece on the side opposite the device, means for securing said plate member to the second end of the driven shaft, and an armature secured to said plate member on the side thereof adjacent the pole piece for rotation with respect to the pole piece, said plate and armature forming a relatively heavy inertia element on the second end of the driven shaft to stabilize the shaft and counter-balance the power transmitting means on the first end of the driven shaft.

5. In combination with a driving and/or driven device having a driven shaft, a motorizing and generating unit comprising, a relatively flat disk having a peripheral flange and an inwardly extending central tubular projection which is adapted to surround the outer end of said driven shaft, means for securing said member to said shaft, a commutator surrounding said central projection, an armature winding positioned on the interior of said peripheral flange, a plurality of field windings, means for supporting said field windings consisting of a substantially solid cylindrical disk having a central aperture which closely encloses the driven shaft so as to form with the driven shaft on a plane transverse to the shaft a substantially solid mass within the interior of the armature, said disk being positioned in axial prolongation of the commutator on a side thereof opposite to said first named disk, a plurality of brushes carried by said disk on the side thereof adjacent the commutator and in contact with the commutator, and means for supporting said last named disk including a plate member rigidly secured to said disk on the side opposite to the commutator, said plate on its opposite side being substantially flat to fit directly against one side of said driving and/or driven device to thereby minimize the area occupied by said motorizing and generating unit.

6. In combination with a driving and/or driven device having a main driven shaft, a flat base plate adapted to be bolted directly to one face of the device, said plate having a central opening closely surrounding the driven shaft, a cylindrical field pole piece rigidly secured on one side to the base plate, said pole piece having a central opening forming an extension of the opening in the base plate into which the end of the driven shaft extends, a flat outer plate member parallel with the base plate and having a circular flange turned inwardly at its outer edges to surround the pole piece and forming an enclosure on the side of the pole piece opposite the device, an armature rigidly bolted within the interior of said member for rotation with respect to the pole piece, and fastening means passing through the outer surface of said member at a central portion thereof for securing said member to the outer end of the driven shaft whereby said member and its connected armature rotate in unison with the driven shaft.

7. In combination with a driving and/or driven device having a main driven shaft, a flat plate member adapted to be bolted directly to a face of the device, said plate member having a central opening closely surrounding the driven shaft, a cylindrical pole piece rigidly secured on one lateral surface of said plate member in such a manner as to render the pole piece stationary, said pole piece having an opening extending through its central axis to provide entry for said driven shaft, a flat circular plate member positioned on the opposite lateral side of the pole piece and forming an enclosure about the side of the pole piece opposite the device and parallel to the first named plate member, a central tubular projection on one side of said plate member which extends into the central opening of the pole piece and surrounds the outer end of the driven shaft, said projection having an opening therein, fastening means for passage through said opening to secure said plate member to the outer end of the driven shaft, said plate member having an inwardly extending peripheral flange surrounding the outer limits of the pole piece, an armature carried on the inner surface of the peripheral flange and surrounding the pole piece, said armature being in heat exchange relationship with said peripheral flange, and a plurality of thermal radiating members secured to the outer periphery of said flange, said members being in heat transfer relationship with the armature to radiantly discharge heat therefrom.

8. In combination with a driving and/or driven device having a driven shaft that carries a threaded portion at its outer end, a motorizing and generating unit comprising a substantially solid cylindrical pole piece having field windings adjacent its periphery, means for rigidly securing one lateral surface of said pole piece to one side of the device, a plurality of brushes carried on the opposite lateral surface of said pole piece, said pole piece having an opening extending through its central axis, the outer end of said driven shaft being adapted to extend into said opening, a member having a central inwardly extending tubular projection of a size and shape for entry into the central opening in said pole piece and in surrounding relationship to the outer end of the driven shaft, a commutator secured to the outer surface of said central projection in axial prolongation of the pole piece and in contact with said brushes, said member having a peripheral flange which extends beyond the outer limits of the pole piece, an armature carried on the interior of said flange and in surrounding relationship to said pole piece, said member having a relatively flat outer surface and forming in its entirety an outer enclosure for the motorizing and generating unit, said member having a central aperture which extends into the central projection, and a threaded connector adapted for insertion into said opening for securing said member to the outer end of said driven shaft.

9. A starter generator comprising a cylindrical pole piece carrying field windings adjacent its periphery, flat supporting means rigidly secured to one lateral surface of said pole piece in such a manner that the pole piece remains stationary, a plurality of brushes carried on the opposite lateral surface of said pole piece, said pole piece having an opening extending through its central axis, a driven shaft extending through said opening, a plate member having an inwardly extending central projection of a size and shape for entry into the opening in said pole piece on the side opposite to said supporting means, means for connecting said central projection to said driven shaft in such a manner that the plate member rotates in unison with the driven shaft, a commutator positioned on the outer surface of said central projection and at one side of and beyond the outer limits of the pole piece and in contact with said brushes, said second plate member having a peripheral flange which extends beyond the outer limits of the pole piece, an armature carried in the peripheral flange of said plate member and surrounding the pole piece, and a plurality of relatively short arcuately curved vanes mounted in substantially side-by-side relation to each other on each quadrant section of the outer surface of the peripheral flange of said plate member, said vanes being in heat transfer relationship with the armature to form a multiplicity of radiating surfaces which extend about the entire outer surface of the peripheral flange to radiantly discharge heat from the armature.

FREDERICK M. JONES.

REFERENCES CITED

The following references are of record in the file of this patent:

UNITED STATES PATENTS

| Number | Name | Date |
|---|---|---|
| 1,171,948 | Hassler | Feb. 15, 1916 |
| 1,240,738 | Lee et al. | Sept. 18, 1917 |
| 1,447,371 | Andrews | Mar. 6, 1923 |
| 1,505,702 | Curtis | Aug. 19, 1924 |
| 1,751,958 | Treiber | Mar. 25, 1930 |
| 1,760,874 | Lansing | June 3, 1930 |
| 1,936,737 | Tingley | Nov. 28, 1933 |
| 1,949,367 | Chilton | Feb. 27, 1934 |
| 1,958,752 | Heintz | May 15, 1934 |
| 2,053,425 | Else | Sept. 8, 1936 |
| 2,071,870 | Ballentine | Feb. 23, 1937 |
| 2,078,376 | Ford | Apr. 27, 1937 |